United States Patent [19]
Chisholm et al.

[11] Patent Number: 5,854,352
[45] Date of Patent: Dec. 29, 1998

[54] MELT FRACTURE REDUCTION

[75] Inventors: P. Scott Chisholm; Tony Tikuisis; Shivendra Kumar Goyal; Douglas Checknita; Nick Klaus Kurt Bohnet, all of Calgary, Canada

[73] Assignee: Nova Chemical Ltd., Calgary, Canada

[21] Appl. No.: 803,319

[22] Filed: Feb. 21, 1997

[30] Foreign Application Priority Data

Mar. 1, 1996 [CA] Canada .................................. 2170789

[51] Int. Cl.$^6$ ...................................................... C08L 27/12
[52] U.S. Cl. ........................................... 525/199; 525/222
[58] Field of Search ..................................... 525/199, 222

[56] References Cited

U.S. PATENT DOCUMENTS

| | | | |
|---|---|---|---|
| 3,125,547 | 3/1964 | Blatz | 525/199 |
| 4,753,995 | 6/1988 | Chu et al. | 525/199 |
| 4,963,622 | 10/1990 | Heitz | 525/227 |
| 5,314,965 | 5/1994 | Kishida et al. | 525/309 |

*Primary Examiner*—Melvyn I. Marquis
*Assistant Examiner*—D. Aylward
*Attorney, Agent, or Firm*—Kenneth H. Johnson

[57] ABSTRACT

The extrusion of thermoplastic polyolefin, especially linear low density polyethylene (LLDPE) is improved by the use of a processing additive comprising a blend of a thermoplastic acrylic polymer and a fluorocarbon polymer. In a preferred embodiment, the processing additive is a homogeneous blend of a thermoplastic styrene/methyl methacrylate polymer and a thermoplastic copolymer of vinylidene fluoride and hexafluoropropylene. The polyolefin extrudates produced according to this invention have reduced levels of melt fracture when extruded in conventional polymer extrusion equipment.

5 Claims, 2 Drawing Sheets

MELT FRACTURE REDUCTION

FIELD OF THE INVENTION

The present invention generally relates to polyolefin blends suitable for use in extrusion processes. More particularly the present invention relates to polyolefin compositions suitable for the manufacture of blown film having a good surface appearance. The invention further relates to a novel composition of matter consisting of a blend of a thermoplastic, acrylic-containing polymer and a thermoplastic fluorocarbon polymer which is useful as an additive for extrudable polyolefin compositions.

BACKGROUND OF THE INVENTION

In the manufacture of extruded polymers there are a number of surface defects referred to as sharkskin, snakeskin and orange peel which all are related to the rheology of the polymer melt and in particular the melt fracture of the polymer. Melt fracture arises when the shear rate at the surface of the polymer is sufficiently high that the surface of the polymer begins to fracture. That is there is a slippage of the surface of the extruded polymer relative the body of the polymer melt. The surface generally can't flow fast enough to keep up with the body of the extrudate and a fracture in the melt occurs generally resulting in a loss of surface properties for the extrudate.

U.S. Pat. No. 3,125,547 issued Mar. 17, 1964 assigned to E.I. DuPont de Nemours and Company discloses blends of polyethylene and small amounts of electomeric fluoropolymers to provide a smooth surface on extrudate at high extrusion speeds.

U.S. Pat. No. 4,753,995, assigned to Mobil Oil Corporation, discloses the use of vinylidene fluoride homopolymer to improve the extrusion of low density polyethylene.

In U.S. Pat. No. 4,963,622, assigned to Union Carbide Corporation, it is disclosed that the use of an acrylic processing aid improves the extrusion of high density polyethylene (HDPE). However, the use of this processing aid provides only a marginal improvement in the extrusion of linear low density polyethylene LLDPE having a narrow molecular weight distribution.

Acrylic polymers are generally much less expensive than fluoropolymers. Accordingly, there is an economic incentive to employ acrylics rather than fluoropolymers as processing additives. However, the simple addition of an acrylic polymer and a fluoropolymer to a polyethylene extrusion process has been observed to produce antagonistic results (i.e. the performance produced by one has been observed to be adversely affected by the simple addition of the other).

We have now surprisingly discovered that a premixed acrylic/fluoropolymer blend improves the extrusion of a thermoplastic polyolefin. We further discovered a new, homogeneous blend of a thermoplastic styrene/methyl methacrylate ("SMMA") copolymer and a thermoplastic vinylidene fluoride/hexafluoropropylene copolymer which is an excellent processing additive for the extrusion of thermoplastic polyolefin.

SUMMARY OF THE INVENTION

In one embodiment, the present invention provides:
An extrudable composition comprising:
A) a major component of a thermoplastic polyolefin; and
B) less than 1 weight per cent, based on the weight of said thermoplastic polyolefin, of a blend of a fluorocarbon polymer and an acrylic-containing thermoplastic polymer.

The present invention also provides a novel composition of matter consisting of:
A polymeric blend comprising:
A) a first thermoplastic copolymer comprising of from about 80 to about 45 weight per cent of bound styrene and, correspondingly, to 100 weight per cent, from about 20 to about 55 weight per cent of bound methyl methacrylate; and
B) a second thermoplastic copolymer comprising vinylidene fluoride and up to about 15 weight per cent of bound hexafluoropropylene, wherein:
(a) the weight ratio of said first thermoplastic copolymer to said second thermoplastic copolymer is from about 95/5 to 5/95; and
(b) said blend is homogeneous as indicated by having an essentially uniform color by visual inspection.

This novel composition of matter is a preferred processing additive for extrudable thermoplastic polyolefins.

The compositions of this invention are particularly preferred for use in well known methods to prepare blown film (typically having a thickness of from 0.2 to 30 mils) and polyolefin-coated wire and cable. The compositions may also be useful for the extrusion of profiles such as pipes or tubing and/or the extrusion of thick films (typically greater than 20 mils) such as those used in so-called geomembranes.

DETAILED DESCRIPTION

Figure 1:
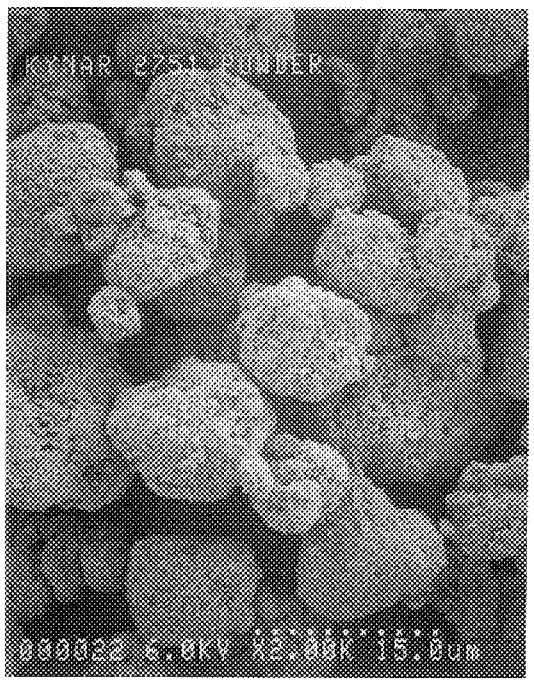
FIGS. 1 and 2 are reproductions of SEM photomicrographs of a sample of a thermoplastic vinylidene fluoride/hexafluoropropylene copolymer (PVdF/HFP).

This invention is generally directed towards improvements in the extrusion of thermoplastic polyolefins (especially LLDPE) through the use of a processing additive which is a polymeric blend of an acrylic-containing thermoplastic and a fluorocarbon polymer.

The term thermoplastic polyolefin encompasses a number of widely used plastics which are prepared by olefin polymerization. Examples of such thermoplastic polyolefins include polyethylene homopolymer, polypropylene homopolymer, and copolymers of ethylene with small amounts of at least one other olefin—such as propylene, butene-1, hexene-1 or octene-1.

The invention is useful for thermoplastic polyolefins in general but is particularly well suited for improving the extrusion of linear low density polyethylene. LLDPE is a copolymer of ethylene with another alpha olefin (such as the aforementioned butene, hexene or octene) which has a density of less than 0.940 grams per cubic centimeter. Such LLDPEs are well known items of commerce and may be prepared by conventional polymerization processes. The polymerization may be in the gas phase (that is, at relatively low pressures below 500 psi, preferably below about 250 psi; at temperatures below about 130° C.; and using a fluidized bed catalyst (such as the process patented by Union Carbide Corporation)); in solution (a process at high temperatures—typically from about 130° to 300° C., by dissolving ethylene and other comonomer(s) in a solvent such as hexane and in the presence of a coordination catalyst such as those disclosed in a number of patents in the name of DuPont) or slurry polymerization initiated by a coordination catalyst or in the case of high pressure polymerization by free radicals. The so-called metallocene catalysts may be used in all of these polymerization processes and the details of such types of polymerization are generally well known.

Depending on the type of polymerization, the olefin polymer may have a molecular weight (weight average— "Mw") from about 10,000 up to 1,000,000, typically from about 100,000 to 350,000. More than one type of LLDPE may be present in the extrudable compositions.

This invention generally encompasses the use of certain blends of a fluorocarbon polymer and an acrylic polymer as additives to improve polyolefin extrusion. The term "acrylic polymer" is widely known but may mean different things to different people. Accordingly, we have used the term "acrylic-containing thermoplastic polymer" to describe polymers which are suitable. As used herein, the "acrylic-containing thermoplastic polymer", (or "ACTP"), is a polymer which:

(a) is polymeric (i.e. it has a weight average molecular weight of greater than 500);

(b) is thermoplastic (i.e. it will soften when heated and harden when cooled and will do so for more than one heat/cool cycle);

(c) is prepared using an "acrylic monomer: (i.e. acrylic acid, or an ethylenically unsaturated derivative thereof such as methyl methacrylate, ethyl methacrylate or butyl methacrylate); and (d) contains at least 20 weight per cent of polymer units (or "bound" units) of the above defined monomer (c).

Thus, the defined term does include the well known polymer methyl methacrylates (such as those sold under the trademark PLEXIGLAS by Rohm and Haas); the so-called acrylic process aids which are well known to those skilled in the art of preparing polyvinyl chloride compounds (such as those sold under the trademarks PARALOID and/or ACRYLOID by Rohm and Haas—which PARALOID and ACRYLOID process aids are reported to be copolymers of methyl methacrylate, butyl acrylate and styrene); and the well known styrene/methyl methacrylate copolymers such as those sold under the trademark NAS by Novacor Chemicals Inc. of Leominster, Mass. However, the term does not include polymers which contain less than 20 weight per cent of the acrylic monomer—such as, for example, copolymers of a major portion (typically greater than 90 weight per cent) ethylene with a minor amount of a lower alkyl acrylate or the so-called "carboxylated polyolefins" (which typically contain less than 2 weight per cent of an acid or acrylate monomer which is grafted to the polyolefin).

The term "fluorocarbon polymer" is meant to convey its conventional meaning, namely homopolymers and copolymers of the fluorinated olefins having a fluorine: carbon atom ratio of at least 1:2 and preferably at least 1:1.

Suitable homopolymers may be prepared from vinylidene fluoride or vinyl fluoride. Copolymers may further include a fluorinated olefin (such as hexafluoropropylene) or a non-fluorinated olefin. This term includes both elastomeric and thermoplastic polymers. "Fluoroelastomers" may be synthesized, for example by copolymerizing vinylidene fluoride ("VdF") and hexafluoropropylene ("HFP") so as to produce a polymer containing about 25 to 50 weight per cent of "bound" hexafluoropropylene. These bound hexafluoropropylene units disrupt the crystallinity of the polymer and thus help to provide an elastomeric polymer. Such fluoroelastomers are sold under the trademark VITON by E.I. DuPont de Nemours and by Minnesota Mining and Manufacturing ("3M") under the trademark DYNAMAR.

It should be further noted that VdF/HFP copolymers which contain less than about 15 weight per cent HFP may be thermoplastic. Elf Atochem of Philadelphia, Pa. sells different thermoplastic fluorocarbon polymers under the trademark KYNAR which include both vinylidene fluoride homopolymers and VdF/HFP copolymers containing low levels of HFP.

The acrylic-containing thermoplastic polymer and the fluorocarbon polymer must be blended together prior to the use of the blend to improve polyolefin extrusion. Accordingly, it is especially preferred to:

(1) use an ACTP with good "processibility" (i.e. an ACTP which is readily melt processed when subjected to heat and shear);

(2) use a combination of an ACTP and fluorocarbon polymer with similar "processibility" characteristics; and (3) in the ideal case, use an ACTP and fluorocarbon polymer which satisfy the above two criteria and which are at least partly miscible with each other.

It has been reported that polymethylmethacrylate ("PMMA") is miscible with polyvinylidene fluoride (Ref: Kirk-Othmar Encyclopedia of Chemical Technology, 3rd Edition, Volume 18, p. 464). However, PMMA can be difficult to melt process.

We have discovered that SMMA may be conveniently blended with thermoplastic VdF/HFP using conventional polymer mixing equipment. It is possible to prepare "homogeneous" blends in this manner, and we believe that these homogenous blends are novel, per se.

The term "homogeneous" may mean different things to different people, but as used herein it refers to a polymer blend which:

(a) has a uniform visual appearance (with respect to a uniform color and an essential lack of visible physical occlusions); and/or (b) has a well mixed, "matrix/domain" morphology which is apparent upon examination by scanning electron microscopy—as evidenced by the existence of discrete particles having a size of less than 4 microns.

Thus, we have discovered that a "premixed" blend of an ACTP and fluorocarbon polymer is useful as an additive to improve the extrusion of polyolefins. The weight ratio of ACTP/fluorocarbon polymer may be from 95/5 to 5/95, with preferred blends having a weight ratio of from 10/90 to 25/75. The most highly preferred blends contain SMMA and a thermoplastic VdF/HFP copolymer in these weight ratios.

The blend is added to the thermoplastic polyolefin in an amount sufficient to provide from 0.01 weight per cent (100 ppm) to 0.2 weight per cent (2000 ppm) of the fluorocarbon polymer, based on the weight of the thermoplastic polyolefin.

Amounts less than 0.01 weight per cent may not provide consistent improvements in the extrusion of polyolefins. Amounts greater than 0.2 weight per cent may be employed but are expensive and wasteful.

The thermoplastic polyolefin-containing compositions of the present invention may further include fillers, antioxidants (at least a primary and optionally a secondary antioxidant), pigments, opacifying agents, static control agents such as glycerol monostearate and/or low molecular weight polyethylene glycol (e.g. CARBOWAX 3000, sold by Union Carbide Corporation), light stabilizers (such as hindered amine light stabilizers), zinc oxide, antiblock agents and other adjuvants. Some care must be taken when using antiblock agents (such as silica or talc) and/or hindered amine light stabilizers as these may have an adverse effect upon the surface appearance of the polyolefin extrudate—as is known to those skilled in the art.

For film applications, preferably no pigment or filler is added and the film is clear or relatively clear. In other applications such as wire and cable (electrical or optical) the compound may contain a pigment/filler such as carbon black and other adjuvants (in these types of applications the unsubstituted olefin polymer may be grafted by extrusion with a functional ethylenically unsaturated monomer such as maleic anhydride in the presence of a free radical agent such as a peroxide).

Typically if an antioxidant (primary alone or optionally in combination with a secondary antioxidant) is used it is used in an amount from about 0.01 to 2, preferably 0.01 to about 1 weight %. Fillers may be incorporated into the compositions of the present invention in amounts up to about 50%, preferably less than about 30%.

Typically, the extrudable polymer compositions of the present invention will be prepared by melt blending. There are several methods which could be used to produce the compositions of the present invention. All the components, including the premixed ATCP/fluorocarbon polymer blend, may be dry blended in the required weight ratio in a suitable device such as a tumble blender. The resulting dry blend is then melted in suitable equipment such as an extruder. A masterbatch could be prepared with some of the polyolefin and the other ingredients. The masterbatch is then fed to an extruder and melt blended. In a third method the dry components of the blend may be metered directly into an extruder.

The extruder may be a twin or single screw extruder. If it is a twin screw extruder it may be operated in a co-rotating mode (i.e. both screws turning in the same direction) or in a counter rotating mode (i.e. the screws rotate in opposite directions).

The specific conditions for operation of any extruder will differ from that of any other extruder. The variations between machines may usually be resolved by non-inventive testing. Typically, laboratory twin screw extruders will operate within the following envelope of conditions. The barrel will be heated to a temperature from about 180 to 210, preferably from 190° to 200° C. The screw speed will normally be from 50 to 150, preferably from 100 to 130 RPM's. The back pressure on the extruder will be from about 1000 to 1300, preferably from 1100 to 1250 psi. As noted above the specific conditions for the operation of any specific extruder can readily be determined by one skilled in the art by non-inventive testing in view of the above envelope of conditions.

The extruder will typically extrude the polymer composition as strands which are then cooled and cut into pellets for subsequent use, typically film extrusion.

The film extruder may also be a single or twin screw extruder. The die may be a slot die or it may be an annular ring die extruding a film of the polymer blend about a stable bubble of air. The film is collapsed after passing over or about the bubble.

EXAMPLE 1

Preparation of ACTP/Fluorocarbon Polymer Blend

The ACTP polymer used in this example was a styrene/methyl methacrylate copolymer sold under the trademark NAS 30 by Novacor Chemicals Inc. and was reported to contain about 30 weight per cent bound methyl methacrylate and about 70 weight per cent bound styrene. The melt flow rate (as determined by ASTM D1238 at 230° C. under a load of 3.8 kilograms) was reported to have a typical value of 8.6 grams per 10 minutes.

A sample of the NAS 30 was examined by scanning electron microscopy ("SEM"). The sample was prepared by first attaching it to an aluminum specimen mount and then sputter-coating it with a thin layer of gold to improve electrical conductivity. The accelerating voltage of the instrument was set at 6 kv. The SEM photomicrograph of this sample was unremarkable—showing the appearance of a homogeneous (though slightly rough) polymer surface.

The fluorocarbon polymer used in this example was a thermoplastic copolymer of vinylidene fluoride and hexafluoropropylene sold in powder form under the trademark KYNAR 2751 by Elf Atochem of Philadelphia, Pa. Reported (typical) physical properties of KYNAR 2751 are given below:

Melting Point: 135° C.

Melt Viscosity at 230° C.: 20,000–25,000 Poise

Figure 2:
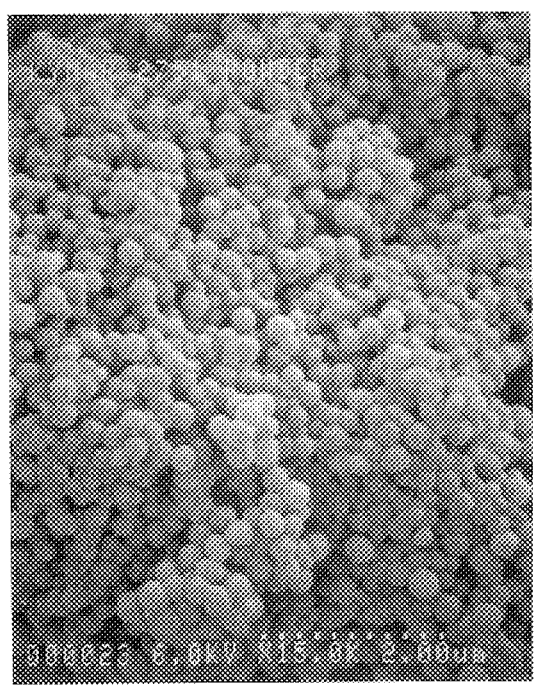

Melt Flow Rate: (ASTM DI 238 at 230° C. under 12.5 kg load) 4–10 grams/10 minutes A sample of the KYNAR 2751 was examined by SEM. FIGS. 1 and 2 are reproductions of photomicrographs of the KYNAR 2751 at 2000× and 15,000× magnification, respectively. FIG. 1 shows that fluorocarbon polymer consists of particles which are generally less than about 20 microns across. FIG. 2 shows that each of these particles appears to be an agglomeration of smaller, generally spherical particles which are less than 0.4 microns in diameter.

Two blends of the NAS 30/KYNAR 2751 were then prepared in a lab scale Brabender-type ("mixing bowl") polymer mixer under conditions of heat and shear.

The first blend contained 25 weight per cent NAS 30 and 75 weight per cent of KYNAR 2751 (blend "1A").

The second blend contained 10 weight per cent NAS 30 and 90 weight per cent of KYNAR 2751 (blend "1B").

Both of the blends appeared homogeneous by visual inspection as evidenced by uniform color and a lack of occlusions (i.e. no "chunks" or "specks" were observed).

Figure 3:
FIG. 3 is a reproduction of an SEM photomicrograph of a homogeneous blend of about 25 weight per cent of SMMA and 75 weight per cent of PVdF/HFP.

A sample of the 25 weight per cent NAS 30/75 weight per cent KYNAR 2751 was prepared for SEM examination using the previously described sample preparation procedures. FIG. 3 is a reproduction of an SEM photomicrograph of this blend (10,000× magnification). The presence of particles having maximum dimensions of less than 2 microns is indicative of a homogeneous blend.

A small region of this blend was then subjected to fluorine analysis. This analysis showed that the fluorine was well dispersed in the sample.

EXAMPLE 2

A laboratory scale twin screw extruder was used to prepare blends of LLDPE, conventional stabilizers, other conventional adjuvants, and a process aid consisting of the KYNAR 2751/NAS 30 blends from Example 1.

A blend made with a fluoroelastomer sold by 3M under the trademark DYNAMAR 9613 (a conventional process aid) was prepared for a control.

The formulations are shown in Table 1. All figures are shown as weight percentages.

TABLE 1

| Component: | Ex. 1 | Ex. 2 | Ex. 3 | Ex. 4 |
|---|---|---|---|---|
| LLDPE[1] | 99.705 | 99.70 | 99.64 | 99.665 |
| AO-1[2]/AO-2[3] | 0.03/0.12 | 0.03/0.12 | 0.03/0.12 | 0.03/0.12 |
| Zinc Oxide | 0.015 | 0.015 | 0.15 | 0.015 |
| FE[4] | 0.08 | — | — | — |
| PEG[5] | 0.05 | — | 0.06 | 0.06 |
| Blend 1A[6] | — | 0.135 | 0.135 | — |
| Blend 1B[7] | — | — | — | 0.11 |

Notes:
[1] Ethylene-hexene LLDPE having a density of about 0.918 g/cc and a melt index (ASTM D1238 at 190° C. under a load of 2.16 kg) of about 1.
[2] AO-1 = hindered phenol antioxidant (sold under the trademark IRGANOX 1076 by Ciba Geigy).
[3] AO-2 = phosphite antioxidant (sold under the trademark WESTON 339 by General Electric Company).
[4] FE = fluoroelastomer sold under the trademark DYNAMAR FX 9613 by 3M.
[5] PEG - polyethylene glycol sold under the trademark CARBOWAX 3350 by Union Carbide Corporation.
[6] Blend 1A = 25/75 weight ratio blend of NAS 30/KYNAR 2751 from Example 1.
[7] Blend 1B = 10/90 weight ratio blend of NAS 30/KYNAR 2751 from Example 1.

The amount of blends 1A and 1B were chosen so as to provide about $1.0 \times 10^3$ ppm of the KYNAR (on an LLDPE basis).

The blends were mixed in the extruder at temperatures from about 330° to 380° F. (about 166° to 193° C.); a screw speed of 100 to 101 revolutions per minute and then extruded through a 3 strand die plate having holes of 3/16" (about 0.45 cm) diameter.

These four blends were then individually extruded through a capillary rheometer at 210° C. The capillary had a length/diameter ratio of 20/1. The shear rate in the rheometer was adjusted during each test from a range of less than 100 reciprocal seconds ($s^{-1}$) to a shear rate of about 1350 $s^{-1}$.

It will be appreciated by those skilled in the art that this type of extrusion through a capillary will typically cause surface defects ("melt fracture") in LLDPE extrudates in the absence of a processing additive at a shear rate of less than 200 $s^{-1}$.

The control experiment (Ex. 1 in Table 1; using a conventional fluoroelastomer as the processing additive) showed essentially no melt fracture until a shear rate of about 1350 $s^{-1}$, at which point severe melt fracture was observed (as evidenced by an extremely rough extrudate).

The use of blend "1A" (25% SMMA/75% fluoroplastic; Ex. 2/3) provided similar results, with essentially no melt fracture until a shear rate of about 1350 $s^{-1}$ and some melt fracture above that shear rate.

The use of blend 1B (90% fluoroplastic/10% SMMA; Ex. 4) provided a qualitatively superior result than those from Ex. 1, 2 and 3.

The capillary testing was stopped at a shear rate of 1350 $s^{-1}$, though the degree of melt fracture was obviously less than that observed with the control extrusion and the extrusion which contained "blend 1A".

EXAMPLE 3

Three different types of vinylidene fluoride-based fluoroplastics were evaluated as process additives for the extrusion of polyethylene in a "blown film compound".

The fluoroplastics included a homopolymer vinylidene fluoride (sold under the trademark KYNAR 721), the KYNAR 2751 (as described in examples 1 and 2) and another vinylidene fluoride/hexafluoropropylene sold under the trademark KYNAR 2801.

Each of these three fluoroplastics was used—in the absence of any acrylic-containing thermoplastic—to prepare blends with an LLDPE (similar to the LLDPE used in examples 1 and 2). A total of six blends were prepared, (two for each of the three fluoroplastics, with one blend containing 500 ppm fluoroplastic and the second containing 1000 ppm fluoroplastic on the basis of the LLDPE). The blends also contained minor, conventional amounts of other adjuvants including: a slip agent (750 ppm Erucamide), antioxidant (Irganox 1076 and Weston 399), an amine (sold under the trademark Kemamine), and zinc stearate (500 ppm). More significantly, the blends further contained about 3150 ppm of silica as an antiblock agent.

The six blends were then used on a commercial-sized blown film line (operating at a throughput rate of between about 32 and 33 kg per hour). All six blends showed unacceptable levels of surface defects, with between 60 and 100% of the film surface showing melt fracture defects.

In order to ensure that there was not a machine problem causing these poor results, a control experiment was performed with a conventional fluoroelastomer based additive. This control experiment resulted in the complete elimination of melt fracture at a fluoroelastomer level of less than 1000 ppm.

These data indicate that silica antiblocks are very antagonistic towards the effectiveness of vinylidene fluoride-containing thermoplastics in the absence of acrylic-containing thermoplastics.

EXAMPLE 4

Compositions Containing Hindered Amine Light Stabilizers

This example illustrates that hindered amine light stabilizer additives (also known as "UV" additives) are antagonistic towards fluorocarbon polymer additives.

A polyethylene blend containing conventional, minor amounts of adjuvants (including 450 ppm of a fluoroelastomer sold under the trademark DYNAMAR FX 9613 by 3M) was prepared without a UV additive. A second blend (otherwise identical to the first blend, except for the addition of 4000 ppm of a UV additive, believed to be a hindered amine, sold under the trademark CHIMASORB 944) was also prepared.

The two blends were then extruded through the capillary rheometer described in Example 2.

Data describing shear viscosity (Pa.s) versus shear rate ($s^{-1}$) are given in Table 2.

As shown in Table 2, the UV additive-containing compositions have substantially higher shear viscosities at equivalent shear rates.

More significantly, the blend containing the UV additive demonstrated onset of melt fracture at a shear rate of about 530 $s^{-1}$ whereas the blend without the UV additive did not demonstrate onset of melt fracture until a shear rate of greater than 900 $s^{-1}$.

TABLE 2

Effect of UV Additive on Shear Viscosity

| Shear Rate, $s^{-1}$ | Shear Viscosity, Pa · s | |
|---|---|---|
| | No UV Additive | With UV Additive |
| 57.6 | 1957 | 2085 |
| 76.8 | 1542 | 1770 |
| 96.1 | 1248 | 1530 |
| 115.2 | 1072 | 1383 |
| 134.2 | 962.1 | 1272 |
| 153.7 | 882.6 | 1185 |
| 191.8 | 790.3 | 1046 |
| 230.3 | 724.1 | 945.1 |
| 307.1 | 638.7 | 800.9 |
| 384.3 | 579.6 | 705.9 |
| 461.1 | 539.1 | 634.0 |
| 537.7 | 506.3 | 577.8 |
| 575.5 | 490.2 | 551.7 |
| 665.0 | 456.8 | 506.4 |
| 729.8 | 441.4 | 472.8 |
| 810.8 | 422.5 | 435.8 |
| 848.2 | 413.5 | 419.4 |

What is claimed is:

1. An extrudable composition comprising:
A) a major component of a thermoplastic polyolefin; and
B) less than 1 weight percent, based on the weight of said thermoplastic polyolefin, of a premixed blend of a fluorocarbon polymer and an acrylic-containing thermoplastic polymer said acrylic-containing thermoplastic polymer comprising a copolymer of from about 45 to about 80 weight percent of bound styrene and from about 20 to about 55 weight percent of bound methyl methacrylate.

2. An extrudable composition comprising:
A) a thermoplastic polyolefin; and
B) from 0.01 to 0.2 weight per cent, based on the weight of said thermoplastic polyolefin, of a fluorocarbon polymer, with the provisos that:
  (a) said fluorocarbon polymer is provided as a component of a premixed blend with an acrylic-containing thermoplastic polymer; and
  (b) the weight ratio of said fluorocarbon polymer to said acrylic-containing thermoplastic polymer in said premixed blend is from about 95/5 to 5/95.

3. The composition of claim 2 wherein said fluorocarbon polymer is a thermoplastic copolymer of vinylidene fluoride and up to about 15 weight per cent of bound hexafluoropropylene.

4. The composition according to claim 3 wherein said acrylic-containing thermoplastic copolymer contains from about 20 to about 35 weight percent of bound methyl methacrylate and from about 80 to about 65 weight percent of bound styrene and wherein the weight ratio of said acrylic-containing thermoplastic copolymer to said fluorocarbon polymer is from about 10/90 to 25/75.

5. The composition of claim 4 wherein said premixed blend is homogeneous as indicated by:
A) having an essentially uniform color by visual inspection; and/or
B) the existence of a matrix/particle morphology as determined by microscopy and wherein particles having a size of less than 2 microns are observable by scanning electron microscopy.

* * * * *